Dec. 6, 1960

M. N. HUFFMAN 2,963,493

ANDROSTAN-16-OL-3-ONE COMPOUNDS AND THE PRODUCTION THEREOF

Filed May 31, 1957

INVENTOR

MAX N. HUFFMAN

BY

Mason, Kolehmainen, Rathburn and Wyss

ATTORNEYS

INVENTOR
MAX N. HUFFMAN

Patented Dec. 6, 1960

2,963,493

ANDROSTAN-16-OL-3-ONE COMPOUNDS AND THE PRODUCTION THEREOF

Max N. Huffman, Oklahoma City, Okla., assignor to Lasdon Foundation, Inc., Yonkers, N.Y., a corporation of Delaware Filed May 31, 1957, Ser. No. 662,804

14 Claims. (Cl. 260—397.4)

This invention relates to androstan-16-ol-3-one compounds and to the production thereof. More particularly, it relates to compounds of the general formula,

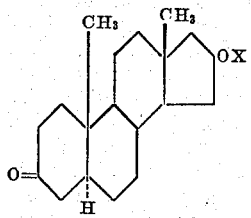

wherein X is hydrogen or a radical selected from hydrocarbon radicals and —COR, —COR'COOH and —SO$_2$R radicals, wherein R and R' are hydrocarbon radicals.

The compounds of this invention bear certain structural relationships to the male sex hormones of the androstane series, but they are significantly different from androsterone and its derivatives in that the positions of the hydroxyl and oxo substituents are changed to new locations in the steroid nucleus. This change in structure significantly modifies the physiological properties of the steroids and, not only completely removes the androgenic and protein metabolic activity thereof, but also inhibits the effect of the male sex hormones.

The compounds of this invention are therefore, free of the undesired sex hormone effects and are useful as competitive inhibitors of the androgenic activity of the male sex hormones, such as, testosterone and androsterone.

It is an object of this invention to provide new steroid compounds of the androstane series and derivatives of such compounds. It is another object of this invention to provide methods of producing such compounds efficiently from available sources of steroids. It is a further object of this invention to provide new and useful steroid compounds which inhibit or antagonize the effect of the male sex hormones.

These and other objects are achieved in accordance with the following description of the invention, taken in connection with the attached drawings.

Referring now to the drawings, comprising five figures which constitute flow diagrams disclosing the synthesis of androstan-16-ol-3-ones and esters thereof:

Figure 4:
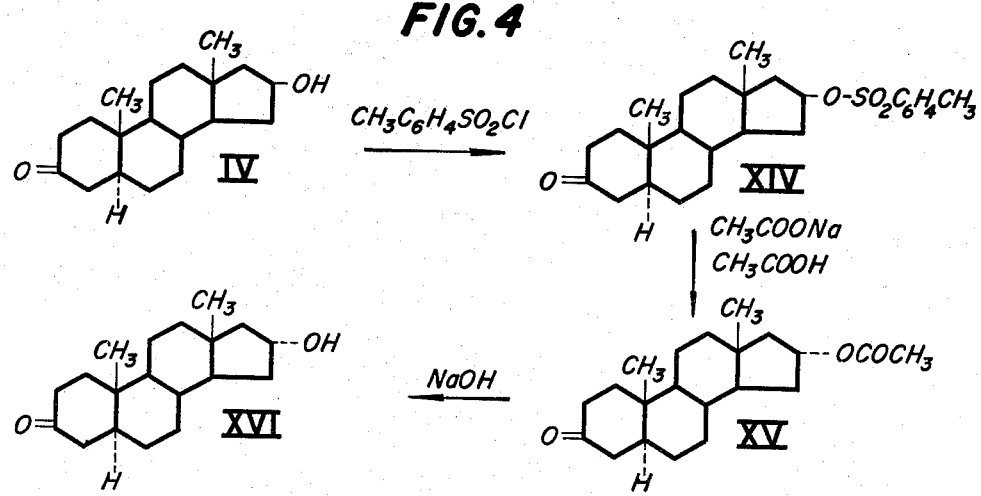
Figure 5:
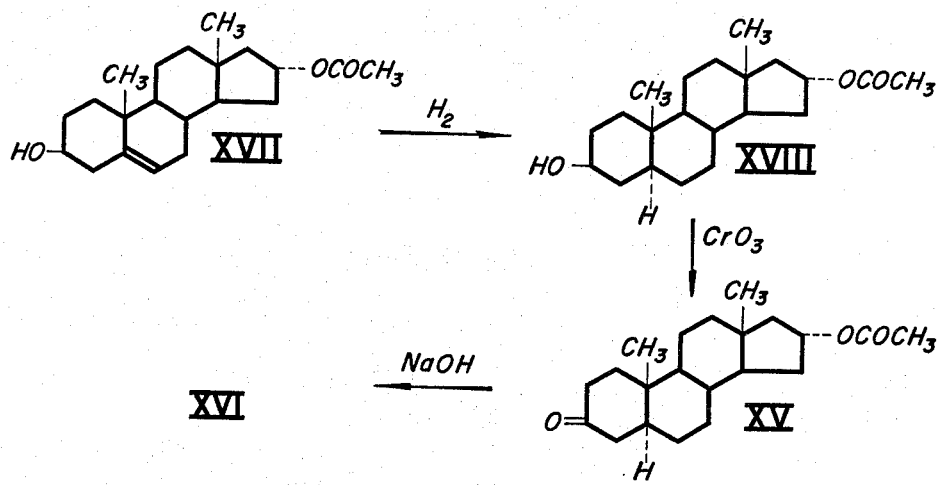

Fig. 4 discloses the synthesis of androstan-16 alpha-ol-3-one from androstan-16 beta-ol-3-one;

Fig. 5 illustrates the production of androstan-16 alpha-ol-3-one from 5-androsten-16 alpha, 3 beta-diol-16-acetate.

Figure 1:
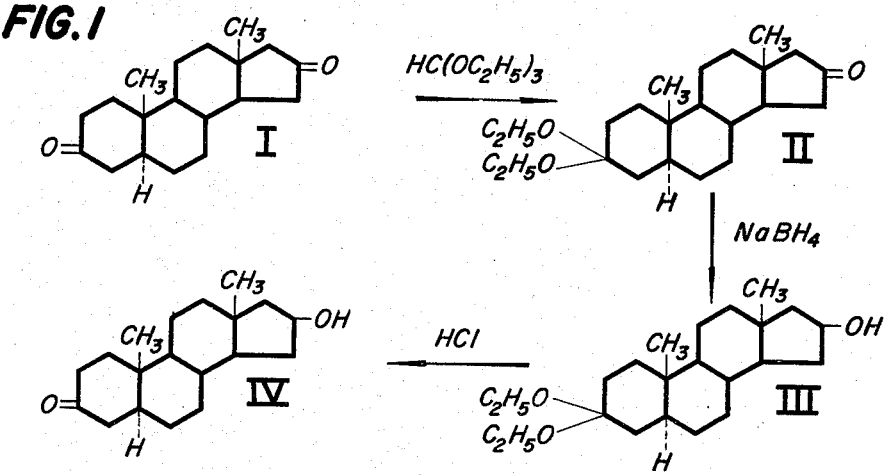
Fig. 1 illustrates the synthesis of androstan-16 beta-ol-3-one from androstan-3,16-dione.

In accordance with Fig. 1, androstan-3,16-dione (I) is converted to a 3-ketal (II) by treatment with an orthoformic acid ester, such as ethyl orthoformate, in absolute ethanol containing a trace of sulfuric acid. The free oxo group at the 16-position of the resultant ketal (II) is then reduced with an alkali metal hydride of a metal of group III of the periodic table, such as, lithium borohydride, sodium borohydride and the like, to form a 16 beta-hydroxyl substituent. The ketal group at the 3-position is then cleaved by treatment with an acid, such as hydrochloric acid, to form the desired androstan-16 beta-ol-3-one (IV).

Figure 2:
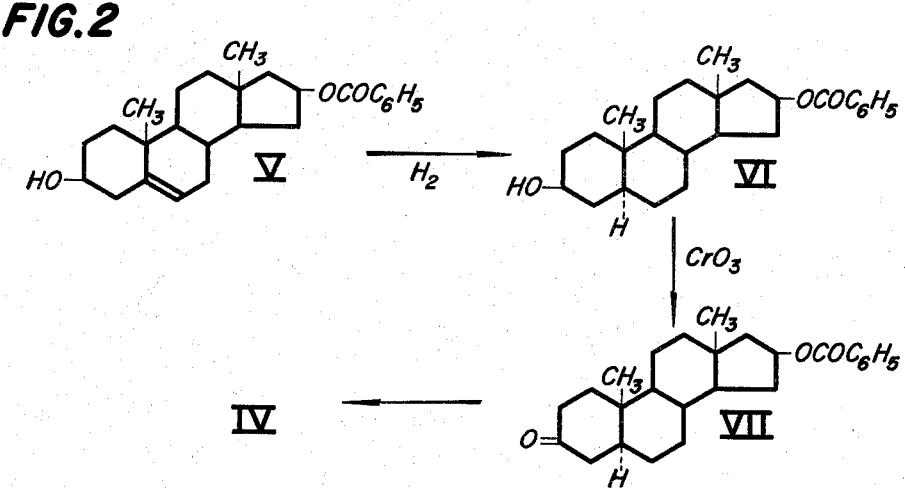
Fig. 2 illustrates the synthesis of androstan-16 beta-ol-3-one from 5-androsten-3 beta, 16 beta-diol-16-benzoate.

Referring now to Fig. 2, 5-androsten-3 beta, 16 beta-diol-16-benzoate (V) (or other 16-ester) is hydrogenated with hydrogen and a noble metal catalyst, such as, palladium on charcoal, to form androstan-3 beta, 16 beta-diol-16-benzoate (VI). The free hydroxyl group at the 3-position is then oxidized with chromic anhydride (CrO$_3$) or other hexavalent chromium oxidizing agent, with the formation of a 3-oxo group. The ester substituent in the 16-position is conveniently hydrolyzed by treatment with alkali to form androstan-16 beta-ol-3-one (IV) which is identical to that produced in accordance with Fig. 1.

Figure 3:
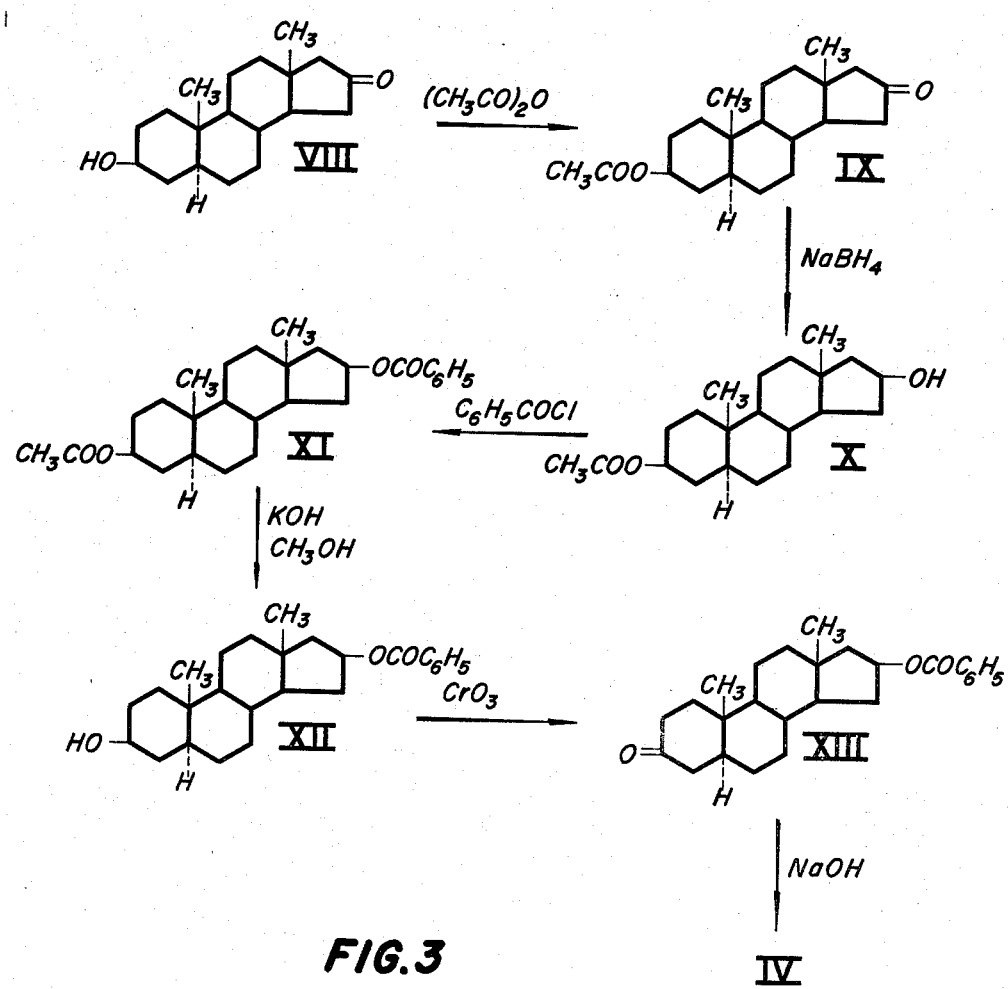
Fig. 3 shows the synthesis of androstan-16 beta-ol-3-one from androstan-3 beta-ol-16-one.

Fig. 3 shows the sequence of reactions wherein androstan-3 beta-ol-16-one (VIII) is converted to androstan-16 beta-ol-3-one (IV). The first step of the synthesis is the protection of the hydroxyl substituent at the 3-position by acetylation or similar alkanoylation whereby the ester (IX) is produced. The 16-oxo substituent is then reduced with an alkali metal hydride of a metal of group III of the periodic table to form a 16 beta-hydroxyl substituent. This free hydroxyl substituent is then esterified to a benzoate or other ester of an aromatic carboxylic acid. The 3-alkanoate radical is selectively saponified with alcoholic alkali to form androstan-3 beta, 16 beta-diol-16-benzoate (XII). The hydroxyl substituent in the 3-position is then oxidized with a hexavalent chromium oxidizing agent in the presence of acid to form a 3-oxo substituent and the benzoate substituent in the 16-position is hydrolyzed, conveniently with alkali, to form androstan-16 beta-ol-3-one (IV).

Fig. 4 outlines the sequence of steps involved in the conversion of androstan-16 beta-ol-3-one (IV) (produced in accordance with the disclosure above) to androstan-16 alpha-ol-3-one (XVI). The hydroxyl group at the 16-position is converted to an ester of an arenesulfonic acid (such as benzenesulfonic or toluenesulfonic acids) and the ester (XIV) is treated with a solution of an alkali metal alkanoate in an alkanoic acid, such as, sodium acetate in acetic acid, whereby the arenesulfonyl radical is replaced by the alkanoyl radical with concurrent epimerization, with the formation of androstan-16 alpha-ol-3-one acetate (XV). The ester (XV) is then hydrolyzed to produce the corresponding androstan-16 alpha-ol-3-one (XVI).

Fig. 5 illustrates an alternative synthesis of androstan-16 alpha-ol-3-one (XVI) starting with 5-androsten-3 beta, 16 alpha-diol-16-acetate (XVII) or similar ester) which is hydrogenated with hydrogen in the presence of a noble metal catalyst to form androstan-3 beta, 16 alpha-diol-16-acetate (XVIII). The 3-hydroxyl group of the latter is oxidized with a hexavalent chromium oxidizing agent to produce the 3-oxo radical of androstan-16 alpha-ol-3-one-acetate (XV) and the latter is saponified with alcoholic alkali to afford androstan-16 alpha-ol-3-one (XVI).

The androstan-16-ol-3-ones of this invention can be readily converted into esters and ethers which have useful physiological properties. Among such esters are the acetate, propionate, butyrate, cyclopentylpropionate, laurate, palmitate, stearate, trimethylacetate, enanthate, phenylacetate and similar esters of fatty acids and derivatives thereof, as well as esters of aromatic acids such as the benzoate, toluate, naphthoate and the like. Esters of dibasic acids, such as, succinic, glutaric, adipic, sebacic, phthalic and the like which contain one or more free carboxyl groups, have been found to be soluble in aqueous alkaline solutions and such esters are a preferred embodiment of this invention for this reason. Arenesulfonic acids, such as, benzenesulfonic acid, naphthalenesulfonic acid, toluenesulfonic acid and the like wherein the arene nucleus contains 6 to 10 carbon atoms, may be used to produce useful esters. The esters of the foregoing type are generally produced by the reaction of the steroids with the respective acid chlorides in the presence of inert amines, such as, pyridine, quinoline, dimethylaniline and the like, and may be isolated from the reaction media by precipitation by the addition of water. Other valuable derivatives include the lower ethers, such as the methyl, ethyl, propyl, butyl, amyl, allyl, crotyl, vinyl, methallyl, propargyl, cyclopentylpropyl, and like ethers, as well as aralkyl ethers, such as, the benzyl and phenethyl ethers. Ethers are prepared by treatment of the hydroxy steroids with the corresponding alkyl halides or sulfates or with alkenyl or aralkyl halides in the presence of acid-binding agents such as sodium hydroxide, potassium carbonate, or silver oxide.

The invention is disclosed in further detail by the following examples which are provided for the purpose of illustration only and are not intended to limit the invention in spirit or in scope. Relative quantities of materials are given in grams and milligrams (mg.) and volumes are presented in milliliters (ml.), while temperatures are recorded in degrees centigrade.

Example 1

To 407 mg. of androstan-3,16-dione (I) (Fajkos and Sorm, Chem. Listiy, 49,727 (1955)) were added 0.25 ml. of ethyl orthoformate, 4.0 ml. of absolute ethanol and one drop of 1% sulfuric acid in absolute ethanol. The resulting solution was refluxed for 30 minutes while protected from atmospheric moisture, then allowed to stand for about 15 hours at about 5° C. The product produced in this way was 3,3-diethoxyandrostan-16-one (II).

The solution of 3,3-diethoxyandrostan-16-one (II) was mixed with a solution of 1.0 gram of sodium borohydride in 100 ml. of absolute methanol and the solution produced was allowed to stand at room temperature for one hour with frequent swirling. In this way, 3,3-diethoxyandrostan-16-one (II) was reduced to 3,3-diethoxyandrostan-16 beta-ol (III). Then a mixture of 10 ml. of acetone and 10 ml. of water was added with thorough mixing to destroy the excess of sodium borohydride. After 1.5 hours, 11.7 ml. of concentrated hydrochloric acid (specific gravity 1.19) were added to the mixture, and the ketal (III) was hydrolyzed by the resulting acid solution in about 15 hours at room temperature. The reaction mixture was then diluted with 1 liter of ether and treated with ice water with good agitation. The ether layer was separated, washed twice with dilute sodium hydroxide solution and twice with water and then evaporated to dryness.

The residue of impure androstan-16 beta-ol-3-one (IV) was dissolved in a mixture of 45 ml. of absolute ethanol and 5.0 ml. of acetic acid. This solution was treated with 5.0 grams of Girard's Reagent T (betainehydrazide chloride) and the solution was refluxed for 1 hour while protected from atmospheric moisture. The reaction mixture was chilled and then treated with 400 ml. of water containing 3.0 grams of sodium hydroxide. The aqueous solution was extracted with 400 ml. of ether and the aqueous phase was acidified with about 31 ml. of concentrated hydrochloric acid to precipitate ketonic material. The ketonic material, that is, androstan-16 beta-ol-3-one (IV), crystallized from the aqueous phase on chilling. It was extracted with ethyl ether, 400 ml., and the ether was washed with water, dilute alkali and again with water. The ether extract was evaporated to dryness and weighed 281 mg.

The androstan-16 beta-ol-3-one (IV) was purified by benzoylation in 5.6 ml. of dry pyridine with 1.4 ml. of benzoyl chloride at room temperature. After about 15 hours at room temperature with occasional swirling, the pyridine solution was diluted with ice water and allowed to stand in the refrigerator. The solid precipitate of androstan-16 beta-ol-3-one benzoate was collected on a filter, washed well with water and dried in vacuum. The product was recrystallized from dilute ethanol and then dissolved in 80 ml. of warm methanol. To this solution 20 ml. of 2.5 normal aqueous potassium hydroxide solution was added. The reaction mixture was refluxed for 1 hour and then evaporated to about half its volume. The residue of impure androstan-16 beta-ol-3-one was partitioned between 400 ml. of ether and 400 ml. of 0.5 normal potassium hydroxide solution. The ether extract was washed with dilute alkali and water and evaporated to dryness.

The dried steroid (androstan-16 beta-ol-3-one (IV)) was treated with 2.0 grams of succinic anhydride and 8 ml. of dry pyridine. The mixture was heated to about 100° C. for 2 hours with occasional swirling while protected from atmospheric moisture. Then 40 ml. of water were added and the mixture heated to 100° C. for 30 minutes with occasional agitation. The cold reaction mixture was extracted with 400 ml. of ether and 400 ml. of 1 normal hydrochloric acid. The ether layer was separated, washed with dilute acid, with water and then with 0.1 normal potassium carbonate solution containing 5% sodium chloride. The carbonate solution containing the androstan-16 beta-ol-3-one hydrogen succinate was collected and treated with sufficient solid potassium hydroxide to make the solution 0.5 normal in order to saponify the succinate. After standing about 15 hours at room temperature the solution deposited crystals of purified androstan-16 beta-ol-3-one (IV). These were extracted with ether and the ether extract was washed with dilute alkali and water and then evaporated to dryness. The residue of steroid was recrystallized from dilute methanol and from a mixture of acetone and petroleum ether. Androstan-16 beta-ol-3-one (IV) thus prepared formed micro-crystals melting at 153–154° C.

Example 2

A solution of 4.15 grams of 5-androsten-3 beta, 16 beta-diol-16-benzoate (V) (Example 4 of applicant's copending application Serial No. 616,429, filed October 17, 1956) in 210 ml. of 95% ethanol was hydrogenated at room temperature in the presence of palladium-charcoal at a hydrogen pressure of 15 p.s.i.g. for a period of 25 hours. The reaction mixture was filtered to remove catalyst, diluted with water and evaporated until crystallization began. It was then refrigerated and a precipitate of androstan-3 beta, 16 beta-diol-16-benzoate (VI) was formed. This was washed with water and dried at 50° C. On recrystallization from 85% methanol, the product melted at 161–162° C.

A solution of 0.5 gram of the above androstan-3 beta, 16 beta-diol-16-benzoate (VI) in 22 ml. of acetic acid was maintained at 25° C. To it was added 9.2 ml. of a chromic acid anhydride solution containing 14 milligrams of chromic acid anhydride ($CrO_3$) in each ml. of 90% acetic acid. The reaction mixture was left at 25° C. for 3 hours with occasional agitation. The reaction mixture was then diluted with 300 ml. of ice water and extracted with 300 ml. of ether. The ether extract was washed with water, with dilute alkali and again with water. On evaporation, the extract gave a residue of androstan-16 beta-ol-3-one benzoate (VII) which was dissolved in 70 ml. of methanol containing 30 ml. of 1.7 normal aqueous sodium hydroxide solution. The resulting solution was refluxed for 1 hour and then evaporated until crystallization ensued. After chilling of the solution, a precipitate of androstan-16 beta-ol-3-one (IV) was collected on a filter, washed with water and dried. After many recrystallizations from aqueous methanol and from acetone-petroleum ether this product formed clusters of needles melting at 154.5–155° C.

Example 3

A solution of 2.0 grams of androstan-3 beta-ol-16-one (VIII) (Huffman et al., J. Biol. Chem., 207, 431–437 (1954)) in 20 ml. of anhydrous pyridine was treated with 20 ml. of acetic anhydride. The reagents were mixed and allowed to stand at room temperature with occasional swirling during a period of about 24 hours. Then the reaction mixture was diluted with 800 ml. of ice water and refrigerated. A precipitate of androsten-3 beta-ol-16-one acetate (IX) was collected on a filter, washed with water and dried. The dry steroid weighed 2.30 grams and was dissolved in 80 ml. of ethyl acetate and cooled to 0° C. A solution of 1.6 grams of sodium borohydride in 80 ml. of methanol was also cooled to 0° C. and added slowly to the former solution. After the addition was complete the reaction mixture was kept at 0° C. for 1.5 hours and then left at room temperature for 1 hour. Dilution of the reaction mixture with 1800 ml. of ice water precipitated the steroid. This was collected on a filter, washed with water and dried at 50° C. The yield of androstan-3 beta, 16 beta-diol-3-acetate (X) was 2.17 grams.

The androstan-3 beta,16 beta-diol-3-acetate (X) produced above was dissolved in 40 ml. of dry pyridine and cooled to 0° C. It was then treated with 10 ml. of benzoyl chloride and allowed to stand at room temperature for about 20 hours with occasional swirling. On dilution with 800 ml. of ice water a precipitate of androstan-3 beta, 16 beta-diol-3-acetate-16-benzoate (XI) was formed. This was removed by filtration and dissolved in 50 ml. of acetone containing 20 ml. of 90% ethanol and 0.5 ml. of pyridine. The solution was charcoaled and evaporated to 100 ml. during the addition of 150 ml. of 95% ethanol. Then 50 ml. of water were added, the solution evaporated to turbidity, chilled, filtered, and dried. After a second recrystallization from acetone and 95% ethanol, the yield of androstan-3 beta,16 beta-diol-3-acetate-16-benzoate (XI) was 2.65 grams of material melting at 143–144° C. This product was dissolved in 470 ml. of absolute methanol and treated with a solution of 0.4 gram of potassium hydroxide in 50 ml. of absolute methanol. The reaction mixture was allowed to stand at room temperature for 2 days with occasional swirling. It was then evaporated to a volume of about 150 ml. and 70 ml. of water was added. On chilling a precipitate of androstan-3 beta,16 beta-diol-16-benzoate (XII) formed which was washed, collected on a filter, washed with 30% methanol and dried. This product weighed 1.95 grams and melted at 157–159° C. It was dissolved in 25 ml. of acetone and the solution evaporated to 15 ml. Then 75 ml. of petroleum ether was added during the evaporation and the final volume of 15 ml. was diluted with 20 ml. of petroleum ether and left at room temperature. The precipitate of androstan-3 beta,16 beta-diol-16-benzoate (XII) was separated, washed with petroleum ether and recrystallized from 80% methanol. The purified androstan-3 beta,16 beta-diol-16-benzoate weighed 1.51 grams and melted at 165–166° C.

A solution of 1.25 grams of androstan-3 beta,16 beta-diol-16-benzoate (XII) in 55 ml. of acetic acid at 25° C. was treated with a solution of 23 ml. of chromic acid anhydride in 90% acetic acid containing 14 mg. of chromic acid anhydride per milliliter. The reaction mixture was kept at 25° C. for 3 hours with frequent swirling. It was then diluted with 700 ml. of ice water and extracted with 750 ml. of ether. The ether extract was washed with water, with dilute alkali and with water and then evaporated. The precipitate of androstan-16 beta-ol-3-one benzoate (XIII) was dissolved in 175 ml. of methanol and to this solution was added 75 ml. of 1.7 normal sodium hydroxide solution. The mixture was refluxed for 1 hour and evaporated until crystallization occurred. It was then refrigerated and the precipitate of androstan-16 beta-ol-3-one (IV) was collected on a filter and recrystallized from dilute methanol. On further crystallization from 70% methanol, the crystals of androstan-16 beta-ol-3-one (IV) melted at 153–154° C. The yield was 0.55 gram.

Example 4

Androstan-16 beta-ol-3-one (IV) (200 mg.) was acetylated in 2 ml. of dry pyridine and 2 ml. of acetic anhydride for about 24 hours and at about 25° C. Androstan-16 beta-ol-3-one acetate was precipitated by the addition of 80 ml. of ice water, and after filtration and drying, it was found to melt at 141° to 142.5° C. It was recrystallized twice from aqueous methanol, yielding 135 mg. of pure androstan-16 beta-ol-3-one acetate melting at 142–142.5° C.

Example 5

A solution of 1.25 grams of androstan-16 beta-ol-3-one (IV) in 25 ml. of dry pyridine was cooled to about 0° C. Then 3.0 grams of p-toluene-sulfonyl chloride were added and the mixture kept at 0° C. for 1 hour with occasional swirling. The reaction mixture was then brought to room temperature and allowed to stand for 24 hours. Dilution with 500 ml. of ice water caused the precipitation of the ester, androstan-16 beta-ol-3-one p-toluenesulfonate (XIV). This was collected, washed with water and dried. It was then refluxed for one hour with 80 ml. of glacial acetic acid containing 4.0 grams of freshly fused sodium acetate in apparatus protected from moisture. The solution was then cooled, diluted with 800 ml. of ice water and refrigerated. A precipitate of androstan-16 alpha-ol-3-one acetate (XV) formed. This was removed, washed and dried.

The androstan-16 alpha-ol-3-one acetate (XV) was dissolved in 200 ml. of methanol containing 100 ml. of 1.5 normal sodium hydroxide solution and the reaction mixture was refluxed one hour. The solution was distilled until crystallization occurred, then cooled and refrigerated. The precipitate of androstan-16 alpha-ol-3-one (XVI) was collected on a filter, washed with water and dried. Upon recrystallization from a mixture of acetone and petroleum ether, a yield of 770 mg. of androstan-16 alpha-ol-3-one was obtained melting at 172–172.5° C.

A sample of androstan-16 alpha-ol-3-one (XVI), purified through its acetate (Example 6), and recrystallized from 60% aqueous ethanol, melted at 176–176.5° C.

Example 6

770 mg. of androstan-16 alpha-ol-3-one (XVI) in 8 ml. of dry pyridine were treated with 8 ml. of acetic anhydride. The reaction mixture was left at room temperature for 24 hours, then diluted with 400 ml. of water. The precipitate, androstan-16 alpha-ol-3-one acetate, was separated and recrystallized from 80% methanol. The purified ester melted at 159.5–160° C. The androstan-16 alpha-ol-3-one acetate (535 mg.) produced above was saponified by one hour's reflux in 100 ml. of 50% aqueous methanol which was 0.5 N with respect to sodium hydroxide. The solution was distilled down to crystallization, and chilled. Upon filtration and drying, the purified androstan-16 alpha-ol-3-one (XVI) was obtained, and after a recrystallization from 60% ethanol the yield was 420 mg. melting at 176–176.5° C.

Example 7

A solution of 8.0 grams of 5-androsten-3 beta, 16 alpha-diol-16-acetate (XVII) (Example 3 of applicant's Patent No. 2,860,147) in 250 ml. of 95% ethanol was hydrogenated at room temperature in the presence of palladium on charcoal at a hydrogen pressure of 15 p.s.i.g. for a period of 3 hours. The reaction mixture was filtered to remove catalyst, diluted with water and evaporated until crystallization began. It was then refrigerated and a precipitate of androstan-3 beta, 16 alpha-diol-16-acetate (XVIII) was formed. This was filtered, washed with water and dried. After one recrystallization from acetone and petroleum ether, a charcoaling in ethanol and a recrystallization from aqueous ethanol; there was a yield of 6.52 grams of pure androstan-3 beta, 16 alpha-diol-16-acetate (XVIII) melting at 167–168° C.

A solution of 6.3 grams of androstan-3 beta, 16 alpha-diol-16-acetate (XVIII) in 250 ml. of glacial acetic acid was maintained at 25° C. To it was added 136 ml. of a chromic acid anhydride solution containing 14 mg. of the chromic acid anhydride in each ml. of 90% acetic acid. The reaction mixture was left at 25° C. for three hours with frequent agitations. The reaction mixture was then diluted with 1500 ml. of ice water and extracted with 3000 ml. of ether. The ether extract was washed with water, with dilute alkali, and again with water. On evaporation, the extract gave a residue of androstan-16 alpha-ol-3-one acetate (XV). This was charcoaled in ethanol, and recrystallized from aqueous ethanol, yielding 5.29 grams of pure androstan-16 alpha-ol-3-one acetate melting at 160–161° C.

The above androstan-16-alpha-ol-3-one (XV) was saponified by one hour's reflux in 150 ml. of 80% ethanol containing 3.0 grams of sodium hydroxide. The solution was evaporated until crystallization began, and refrigerated. After filtering, washing with water, and drying; the yield of unrecrystallized androstan-16 alpha-ol-3-one (XVI) was 4.51 grams, melting at 173–174° C.

What is claimed as new and is desired to be secured by Letters Patent of the United States is:

1. A steroid of the general formula

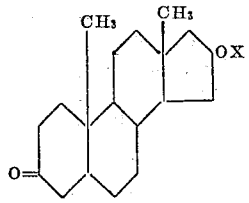

wherein X is a member of the group consisting of hydrogen, R and —COR, —COR'COOH and —SO₂R radicals, wherein R is a hydrocarbon radical containing 1 to 18 carbon atoms and R' is a bivalent hydrocarbon radical containing 1 to 16 carbon atoms.

2. Androstan-16-ol-3-one.
3. Androstan-16 alpha-ol-3-one.
4. Androstan-16 beta-ol-3-one.
5. Androstan-16-ol-3-one ester of an organic carboxylic acid containing not more than 18 carbon atoms.
6. Androstan-16-ol-3-one alkanoate wherein the alkanoate group contains not more than 18 carbon atoms.
7. Androstan-16-ol-3-one acetate.
8. Androstan-16-ol-3-one benzoate.
9. A method of producing androstan-16-ol-3-one which comprises converting androstan-3,16-dione to a 3-ketal to protect the 3-oxo substituent by reaction with an alkyl orthoformate in an alkanol containing acid reducing the 16-oxo substituent to a 16-hydroxyl radical by means of an alkali metal hydride of a metal of group III of the periodic table, and hydrolyzing the 3-ketal substituent with acid to a 3-oxo group, thereby producing androstan-16-ol-3-one.

10. A method of producing androstan-16-ol-3-one which comprises hydrogenating with hydrogen and a noble metal catalyst a 5-androsten-3,16-diol 16-ester of a hydrocarbon carboxylic acid containing not more than 7 carbon atoms to an androstan-3,16-diol 16-ester of said acid, oxidizing said androstan-3,16-diol 16-ester with a hexavalent chromium oxidizing agent to an androstan-16-ol-3-one ester, and hydrolyzing said androstan-16-ol-3-one ester to androstan-16-ol-3-one.

11. A method of producing androstan-16-ol-3-one which comprises reducing an androstan-3-ol-16-one alkanoate with an alkali metal hydride of a metal in group III of the periodic table to form an androstan-3,16-diol-3-alkanoate, forming an ester of said androstan-3,16-diol-3-alkanoate with an aromatic hydrocarbon carboxylic acid to produce an androstan-3,16 - diol - 3 - alkanoate-16-arenoate, saponifying said androstan-3,16 - diol - 3 - alkanoate-16-arenoate to an androstan-3,16-diol-16 arenoate, oxidizing said androstan-3,16-diol-16-arenoate with a hexavalent chromium oxidizing agent to an androstan-16-ol-3-one arenoate and hydrolyzing said androstan-16-ol-3-one arenoate to androstan-16-ol-3-one.

12. A method of producing androstan-16-ol-3-one which comprises forming androstan-3,16-dione-3,3-diethyl ketal by reaction of androstan-3,16-dione with ethyl orthoformate in absolute ethanol containing a trace of sulfuric acid, reducing the 16-oxo substituent of said ketal to a 16-hydroxyl radical by reaction with an alkali metal borohydride, and hydrolyzing the 3-ketal substituent to a 3-oxo group by treatment with hydrochloric acid, thereby producing androstan-16-ol-3-one.

13. A method of producing androstan-16-ol-3-one which comprises hydrogenating 5-androsten-3,16-diol-16-benzoate with hydrogen and a palladium catalyst to androstan-3,16-diol-16-benzoate, oxidizing said androstan-3,16-diol-16-benzoate with CrO₃ to androstan-16-ol-3-one benzoate, and hydrolyzing said androstan-16-ol-3-one benzoate to androstan-16-ol-3-one.

14. A method of producing androstan-16-ol-3-one which comprises reducing androstan-3-ol-16-one acetate with an alkali metal borohydride to form androstan-3,16-diol-3-acetate, benzoylating said androstan-3,16-diol-3-acetate to form androstan-3,16-diol-3-acetate-16-benzoate, saponifying said androstan-3,16-diol-3-acetate-16-benzoate to androstan-3,16-diol-16-benzoate by treatment with alcoholic caustic alkali, oxidizing said androstan-3,16-diol-16-benzoate with CrO₃ to androstan-16-ol-3-one benzoate and hydrolyzing said androstan-16-ol-3-one benzoate to androstan-16-ol-3-one.

References Cited in the file of this patent

UNITED STATES PATENTS 2,779,773    Huffman _____ Jan. 29, 1957

OTHER REFERENCES

Fieser et al.: Natural Products related to Phenanthrene 1949, pp. 375–376.